United States Patent [19]

Svilans

[11] Patent Number: 5,027,178
[45] Date of Patent: Jun. 25, 1991

[54] ELECTRICALLY TUNABLE INTERFERENCE FILTERS AND METHODS FOR THEIR USE

[75] Inventor: Mikelis N. Svilans, Kanata, Canada

[73] Assignee: Northern Telecom Limited, Montreal, Canada

[21] Appl. No.: 389,250

[22] Filed: Aug. 3, 1989

[51] Int. Cl.$^5$ .................. H01L 27/14; H01L 29/161; H01L 33/00; G02F 1/01
[52] U.S. Cl. ........................................ 357/30; 357/16; 357/17; 350/355
[58] Field of Search ...................... 357/30 E, 30 J, 16, 357/17, 58, 4; 350/355

[56] References Cited

U.S. PATENT DOCUMENTS

| | | | |
|---|---|---|---|
| 4,144,540 | 3/1979 | Bottka | 357/16 |
| 4,208,667 | 6/1980 | Chang et al. | 357/16 |
| 4,309,670 | 1/1982 | Burnham et al. | 331/94.5 |
| 4,525,687 | 6/1985 | Chemla et al. | 357/16 |
| 4,568,959 | 2/1986 | Chang et al. | 357/30 E |
| 4,705,361 | 11/1987 | Frazier et al. | 350/355 |
| 4,784,476 | 11/1988 | Schulman et al. | 350/355 |
| 4,947,223 | 8/1990 | Biefeld et al. | 357/16 |

FOREIGN PATENT DOCUMENTS 182271  8/1986  Japan ................ 357/30 E

OTHER PUBLICATIONS

Principles of Optics (Born and Wolf, Pergamon Press, 1964, pp. 51–70.
Multilayer GaAs-$_{0.3}$Ga-$_{0.7}$Gas Dielectric Quarter Wave Stacks Grown by Molecular Beam Epitaxy, van der Ziel et al, Applied Optics, Nov. 1975, vol. 14, No. 11, pp. 2627–2630.
High Reflectivity GaAs-AlGaAs Mirrors Fabricated by Metalorganic Chemical Vapor Deposition, Thornton et al, Appl. Phys. Lett., vol. 45, No. 10, Nov. 15, 1984, pp. 1028–1030.
Single Crystal Epitaxial Multilayers of AlAs, GaAs, and Al$_x$G$_a$1-$_x$As for use as Optical Interferometric Elements, Gourley et al, Appl. Phys. Lett., 49(9), Sep. 1, 1986, pp. 489–491.
Light Modulation by Tunable Interference Filter, Yoffe et al, 45th Annual Device Research Conference, Sponsored by IEEE Electron Devices Society, Jun. 22–24, 1987.
Large Optical Cavity AlGaAs Injection Lasers with Multiple Active Regions, Katz et al, J. Appl. Phys. 51(8), Aug. 1980, pp. 4038–4041.
Electrical Properties of Multi p-n Junction Devices, Katz et al, IEEE Transactions on Electron Devices, vol. ED-29, No. 6, Jun. 1982, pp. 977–984.

(List continued on next page.)

Primary Examiner—William Mintel
Assistant Examiner—Robert P. Limanek
Attorney, Agent, or Firm—C. W. Junkin

[57] ABSTRACT

An electrically tunable interference filter comprises a semiconductor body which has a plurality of semiconductor layers. Each semiconductor layer comprises first and second sublayers which together define a heterojunction and first and second portions which together define a pn junction located at or closely adjacent to the heterojunction. Electrical contacts are provided for biasing the pn junctions. Application of a forward bias to some of the pn junctions causes injection of carriers from the second sublayers across the heterojunctions into the first sublayers to modify the refractive index of the first sublayers. Application of a reverse bias to other of the pn junctions enhances an inherent electric field at the pn junctions to modify the refractive indices of regions adjacent to the pn junctions. The applied reverse bias also depletes carriers from regions of the first and second sublayers to modify the refractive indices of those regions. Such refractive index modifications alter the optical filter characteristics of the plurality of layers, so the filter may be electrically tuned.

18 Claims, 4 Drawing Sheets

OTHER PUBLICATIONS

GaAs Light-Emitting Diodes with n-i-p-i Active Layers Fabricated by Selective Contact Diffusion, Ackley et al, Appl. Phys. Lett. 53(2), Jul. 11, 1988, pp. 125–127.

Refractive Index of $Ga_{1-x}Al_xAs$, Afromowitz, Pergamon Press, Solid State Communications, vol. 15, 1974, pp. 59–63.

Electrically Active Multilayer n-GaAs/p-AlGaAs Quarter Wave Mirrors Grown by Molecular Beam Epitaxy, Fourth Canadian Semiconductor Technology Conference, Aug. 9–11, 1988.

Electrically Active Multilayer n-GaAs-p-AlGaAs Quarter Wave Mirrors Grown by Molecular Beam Epitaxy, Howard et al, Can. J. Phys. 67, 232 (1989), pp. 232–237.

Novel Low-Power Optical Nonlinearity in Semiconductor Quantum Well Electro-Optic Devices, Weber et al, Appl. Phys. Lett., vol. 54, No. 24, Jun. 12, 1989.

ELECTRICALLY TUNABLE INTERFERENCE FILTERS AND METHODS FOR THEIR USE

FIELD OF THE INVENTION

This invention relates generally to multilayer optical interference filters, and more particularly to multilayer optical interference filters which are electrically tunable.

BACKGROUND OF THE INVENTION

A conventional multilayer optical interference filter comprises several thin layers of optically transmissive materials. The materials of adjacent layers have different refractive indices. The filter characteristics are determined by the number, order, thicknesses and refractive indices of the layers. The theory of multilayer interference filters is well developed and is explained in several standard optical references, including Principles of Optics (Born and Wolf, Pergamon Press, 1964, pp. 51-70). Multilayer interference filters are commonly used for wavelength or polarization selective reflection or transmission in mirrors, lenses and beam splitters.

While conventional multilayer optical interference filters are generally made by vacuum evaporation of dielectric thin films on a suitable substrate, other materials and fabrication methods have been used. For example, van der Ziel et al, Thornton et al, and Gourley et al report interference filters comprising alternating layers of undoped GaAs and AlGaAs semiconductor formed by molecular beam epitaxy (MBE) and metalorganic chemical vapour deposition (MOCVD) (van der Ziel et al, Applied Optics, Vol. 4, No. 11, November 1975, pp. 2627-2630, Thornton et al, Applied Physics Letters, 45(10), Nov. 15, 1984, pp. 1028-1030, Gourley et al, Applied Physics Letters 49(9), Sept. 1, 1986, pp. 489-491).

U.S. Pat. No. 4,309,670 (issued Jan. 5, 1982, in the names of R. D. Burnham et al) discloses interference filters comprising alternating layers of $Ga_{1-w}Al_wAs$ and $Ga_{1-y}Al_yAs$ where $w > y$. All of the alternating layers are doped with impurities of the same conductivity type. These interference filters are used as passive reflectors in Distributed Bragg Reflector (DBR) semiconductor lasers.

At the 45th Annual Device Research Conference (Santa Barbara, Calif., June 22-24, 1987, Paper IIIA-4) et al reported that GaAs-AlGaAs multilayer optical interference filters can be made electrically tunable by placing quantum wells in every second layer of the multilayer structure. Application of a large electric field in a direction which is normal to the semiconductor layers of this structure induces changes in the refractive index of the layers containing the quantum wells by a mechanism known as the "quantum confined Stark effect". The induced refractive index changes tune the interference filter, shifting the wavelengths at which maximum reflection and maximum transmission occur. Unfortunately, this electrically tunable interference filter requires large driving voltages (approximately 100 V). Moreover, the large driving voltages induce significant leakage currents. The heat generated by the leakage currents changes the device temperature locally, causing local perturbations of material parameters such as refractive index and producing unwanted changes in the filter characteristics. The generated heat also degrades device reliability.

Katz et al report multilayer semiconductor structures comprising alternating layers of oppositely doped GaAs and GaAlAs (Journal of Applied Physics, 51(8), August 1980, pp. 4038-4041, and IEEE Transactions on Electron Devices, Vol. ED-29, No. 6, June 1982, pp. 977-984). These structures exhibit bistable electronic switching characteristics similar to those of more conventional pnpn devices. Moreover, these structures may be cleaved and polished in planes which are transverse to the planes of the alternating layers to define several parallel Fabry-Perot cavities. The Fabry-Perot cavities may be operated as parallel coupled lasers by biasing the bistable electronic switching device into its "on-state". The alternating layers serve as alternating confinement and active layers during laser operation, and the direction of optical propagation is parallel to the alternating layers, so the alternating layers do not act as a multilayer interference filter in these laser structures.

SUMMARY OF THE INVENTION

One aspect of this invention provides electrically tunable interference filters. The filters comprise a semiconductor body which has a plurality of semiconductor layers. Each semiconductor layer comprises a first sublayer of a semiconductor which has a first band gap and a second sublayer of a semiconductor which has a second band gap, so that the first and second sublayers together define a heterojunction. A first portion of each semiconductor layer is doped with an n-type dopant, and a second portion of each semiconductor layer is doped with a p-type dopant, so that the first and second portions together define a pn junction. The pn junction is located at or closely adjacent to the heterojunction. The filter further comprises electrical contacts to the semiconductor body for biasing the pn junctions.

Another aspect of this invention provides methods for use of the electrically tunable interference filter defined above. The methods comprise providing an electrically tunable interference filter as defined above and directing light onto the semiconductor layers while biasing the pn junctions to electrically tune the filter.

Application of a forward bias to the pn junctions may cause transfer of carriers from the second sublayers across the heterojunctions into the first sublayers to modify the refractive index of the first sublayers. This modifies the optical filter characteristics of the plurality of layers. Thus, the optical filter characteristics of the plurality of layers may be tuned by application of a forward bias to the pn junctions via the electrical contacts.

Application of a reverse bias to the pn junctions may enhance an inherent electric field at the pn junctions to modify the refractive indices of regions adjacent to the pn junctions by the Franz-Keldysh effect. The applied reverse bias may also deplete carriers from regions of the first and second sublayers to modify the refractive indices of those regions. Such refractive index modifications alter the optical filter characteristics of the plurality of layers, so the filter may be tuned by application of a reverse bias to the pn junctions via the electrical contacts.

The electrical contacts may comprise an electrical contact to the top sublayer of the top layer and an electrical contact to the bottom sublayer of the bottom layer, so that the pn junctions are electrically connected in series.

Electrically tunable interference filters according to the invention may be operated with driving voltages which are significantly lower than the driving voltages required to drive the electrically tunable interference filter of Yoffe et al. Moreover, the smaller driving voltages induce lower leakage currents, so less heat need be dissipated to ensure device reliability and to ensure the dimensional stability which is essential to predictable filter characteristics.

BRIEF DESCRIPTION OF THE DRAWINGS

Embodiments of the invention are described below by way of example only with reference to the accompanying drawings, in which.

DETAILED DESCRIPTION OF EMBODIMENTS

Figure 1:
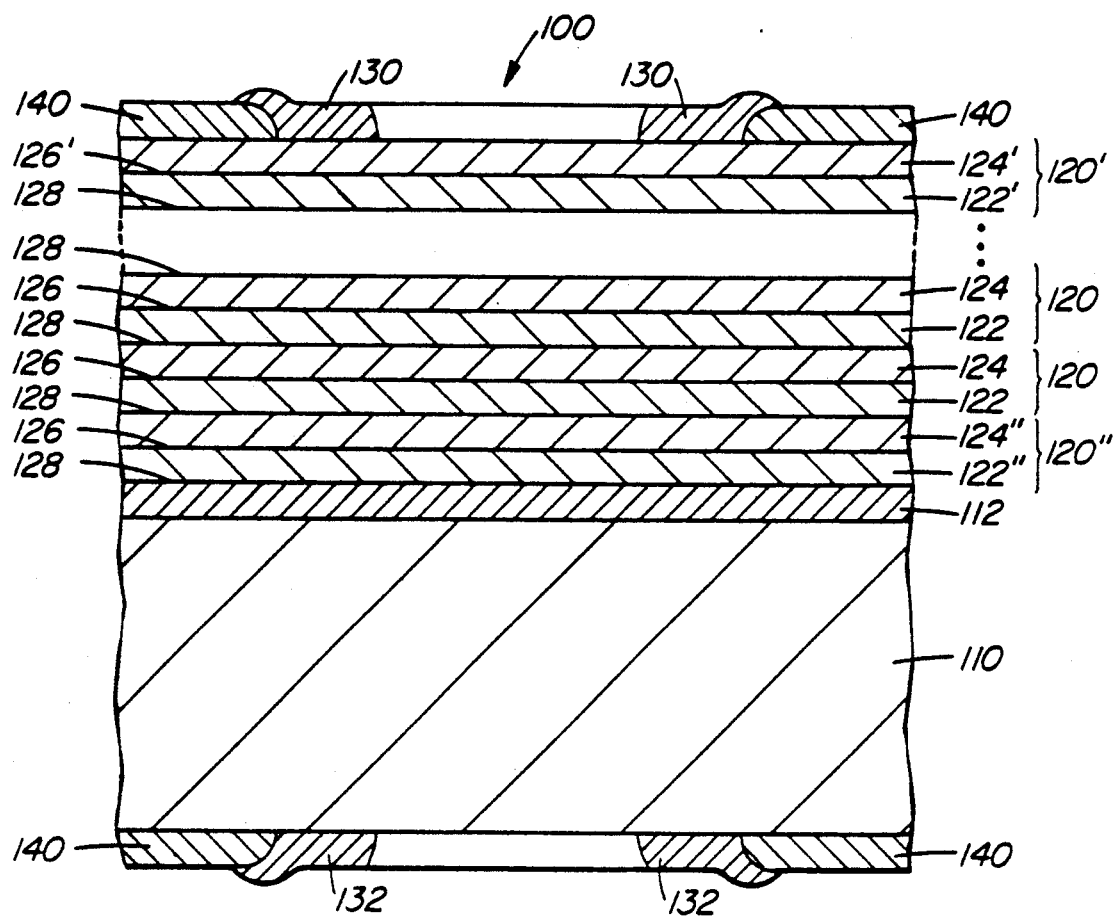
FIG. 1 is a cross-sectional view of an electrically tunable interference filter according to a first embodiment.

FIG. 1 is a cross-sectional view of an electrically tunable interference filter 100 according to a first embodiment.

The filter 100 comprises an n+ GaAs substrate 110, an n+ GaAs buffer layer 112 on the substrate 110, and 25 semiconductor layers 120 on the buffer layer 112. The buffer layer 112 is approximately 1000 Angstrom units thick. Each of the 25 layers 120 comprises an $Al_{0.35}Ga_{0.65}As$ sublayer 122 which is approximately 100 nanometers thick and a GaAs sublayer 124 which is approximately 100 nanometers thick. Thus, the sublayers 122, 124 define a heterojunction 126 in each layer 120. The thicknesses of the AlGaAs and GaAs sublayers 122, 124 are selected to be approximately one quarter the wavelength of photons having a free-space wavelength of 1.3 microns.

Each AlGaAs sublayer 122 is doped with Be to a p-type carrier concentration of $2 \times 10^{17}$ cm$^{-3}$, and each GaAs sublayer 124 is doped with Si to an n-type carrier concentration of $5 \times 10^{17}$ cm$^{-3}$, so the sublayers 122, 124 are doped portions of the layers 120 which also define a doping junction at each heterojunction 126. Doping junctions 128 are also present between each pair of adjacent layers 120, and between the bottom layer 120" and the buffer layer 112.

The filter 100 further comprises an annular electrical contact 130 to the top sublayer 124' of the top layer 120', and an annular electrical contact 132 to the bottom sublayer 122" of the bottom layer 120" by way of the n+ substrate 110 and n+ buffer layer 112.

The filter 100 is constructed by Molecular Beam Epitaxy (MBE) growth of the buffer layer 112 and sublayers 122, 124 on the substrate 110. The growth is carried out in a VG—Semicon V80-H MBE system at a substrate temperature of 670 degrees Celsius while rotating the substrate. The GaAs growth rate is approximately 1 micrometer per hour, and the Al flux is adjusted to achieve the desired Al concentration in the AlGaAs sublayers 124. As$_2$ is used as the As source, and the ratio of As flux to Ga flux is maintained between 3 and 5 during the growth. A 2000 Angstrom unit thick $Si_3N_4$ dielectric coating 140 is deposited on surfaces of the resulting structure, contact openings are made through the dielectric coating, and the annular metallic contacts 130, 132 are evaporated onto top and bottom surfaces of the resulting structure to complete the filter 100.

Figure 2:
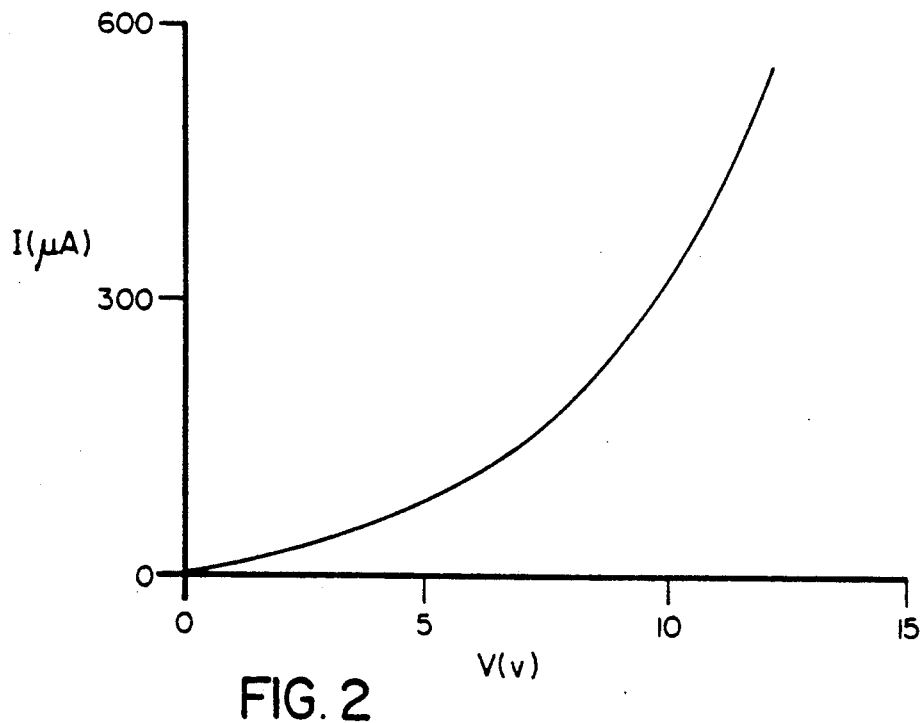
FIG. 2 is a plot of current versus voltage for the filter of FIG. 1.

When an electrical circuit is connected through the contacts 130, 132, the pn junctions 126, 128 are electrically connected in series. If a voltage is applied across the terminals 130, 132, every second pn junction 128 is forward biased, while the other pn junctions 126 are reverse biased. The AlGaAs and GaAs sublayers 122, 124 are thin enough to permit some of the carriers which are injected across the forward biased pn junctions to drift as far as the reverse biased pn junctions where they are swept through the reverse biased pn junctions by an inherent electric field which is enhanced by the applied electric field. Thus, the filter 100 conducts some current when a voltage is applied across the terminals 130, 132 even though every second pn junction is reverse biased. FIG. 2 shows the dependence of the current on the applied voltage.

Figure 3:
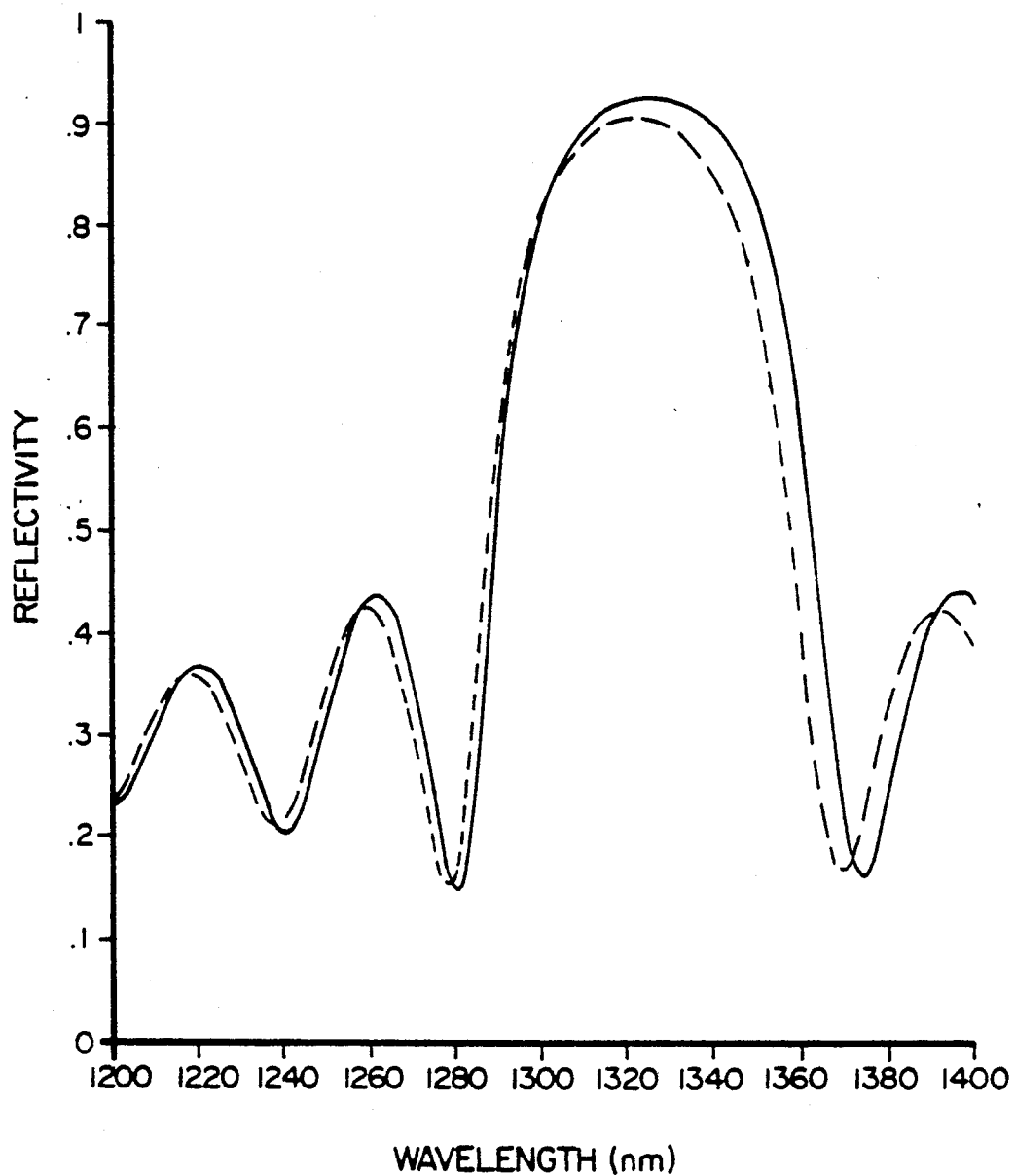
FIG. 3 is a plot of reflectivity versus wavelength for the filter of FIG. 1.

Because the AlGaAs and GaAs sublayers 122, 124 have different refractive indices, they act optically as a multilayer interference filter. FIG. 3 shows the reflectivity of the filter as a function of wavelength for normal incidence.

The solid curve in FIG. 3 shows the reflectivity of the filter 100 when the pn junctions 128 are electrically unbiased. In this case, the refractive indices of the AlGaAs and GaAs sublayers 122, 124 are determined only by the composition of these sublayers, and the reflectivity of the filter is determined only by these refractive indices and the thicknesses of the sublayers 122, 124 according to the standard theory of multilayer interference filters (for example, see Principles of Optics, Born and Wolf, Pergamon Press, 1964, pp. 51-70).

Figure 4:
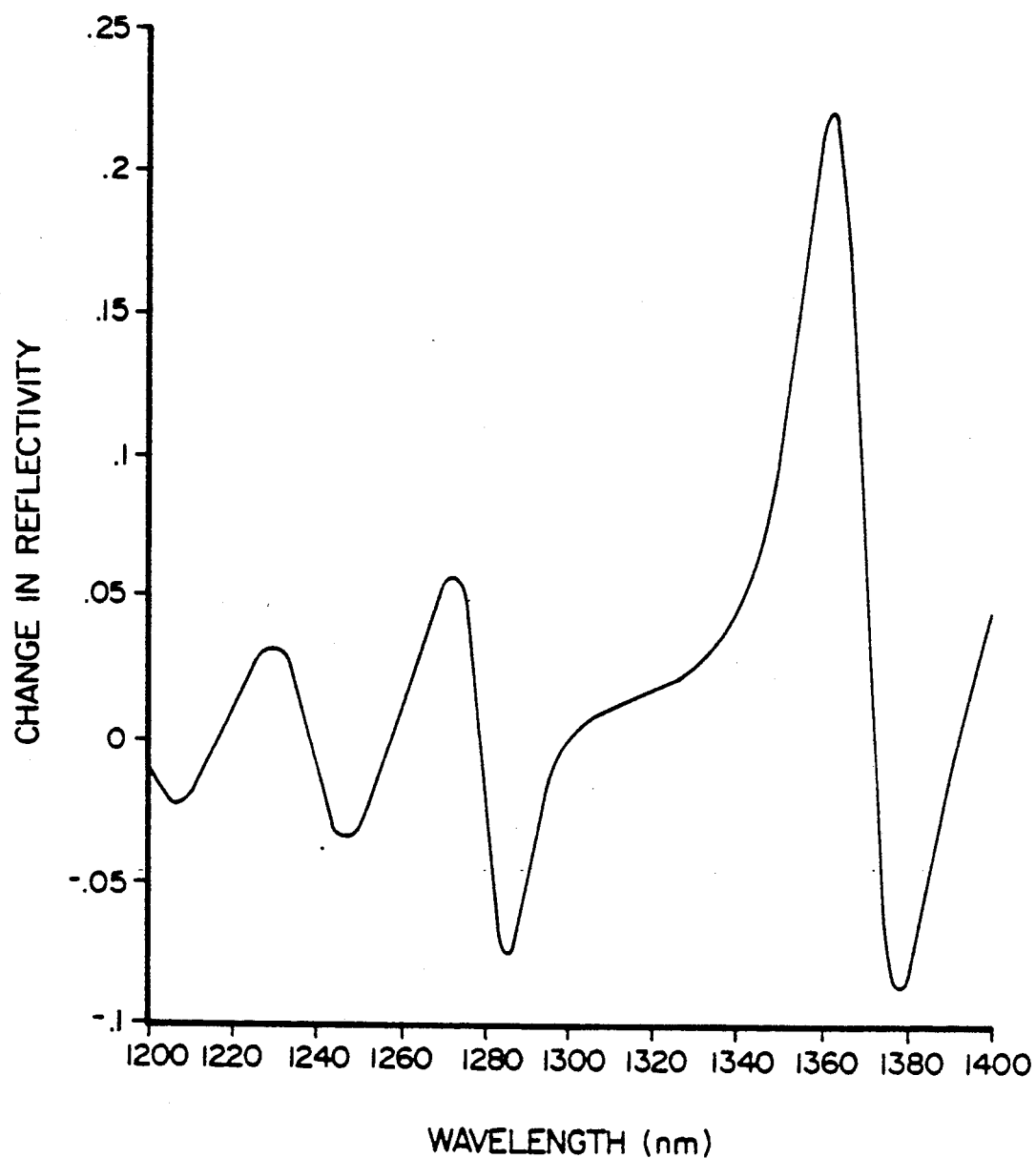
FIG. 4 is a plot of change in reflectivity versus wavelength for the filter of FIG. 1.

However, if a voltage is applied across the contacts 130, 132, carriers will be injected across the forward biased pn junctions. The resulting changes in carrier density in these sublayers will modify the refractive indices of these layers due to plasma effects band filling and Burstein shift, the dominant mechanism depending on the injected carrier concentration. Moreover, the reverse bias which is applied to the other pn junctions enhances inherent electric fields at the pn junctions to modify the refractive indices of regions adjacent to the pn junctions by the Franz-Keldysh, Stark and other effects. The applied reverse bias may also deplete carriers from regions of the AlGaAs and GaAs sublayers 122, 124 which are adjacent to the reverse biased pn junctions to modify the refractive indices of those regions. Although such refractive index modifications are small in absolute terms, they can be sufficient to provide a significant shift with respect to wavelength in the spectral reflectivity characteristics of the multilayer filter 100. The dashed curve in FIG. 3 represents the shifted reflectivity characteristic which may be obtained when the filter 100 is electrically biased so as to reduce the refractive index of the GaAs sublayers 124 by 0.5%. FIG. 4 shows the change in reflectivity as a function of wavelength. In the example shown, the peak reflectivity of the filter 100 is shifted from a wavelength of approximately 1327 nanometers to a wavelength of approximately 1323 nanometers, and the reflectivity at a wavelength of approximately 1362 nanometers is reduced from 0.53 to 0.31. Thus, the application of an electrical bias can be used to "tune" the filter characteristics within a limited range, or to modulate or switch the amplitude or phase of an optical signals at a particular wavelength.

An electrically tunable interference filter according to a second embodiment may be constructed as described above for the filter 100 according to the first embodiment, except that Zn is diffused into the top sublayer 124' of the top layer 120' to change the conductivity type of this sublayer from n-type to p-type. When this is done, the uppermost heterojunction 126' is no longer a pn junction, and an odd number of pn junctions remain.

Figure 5:
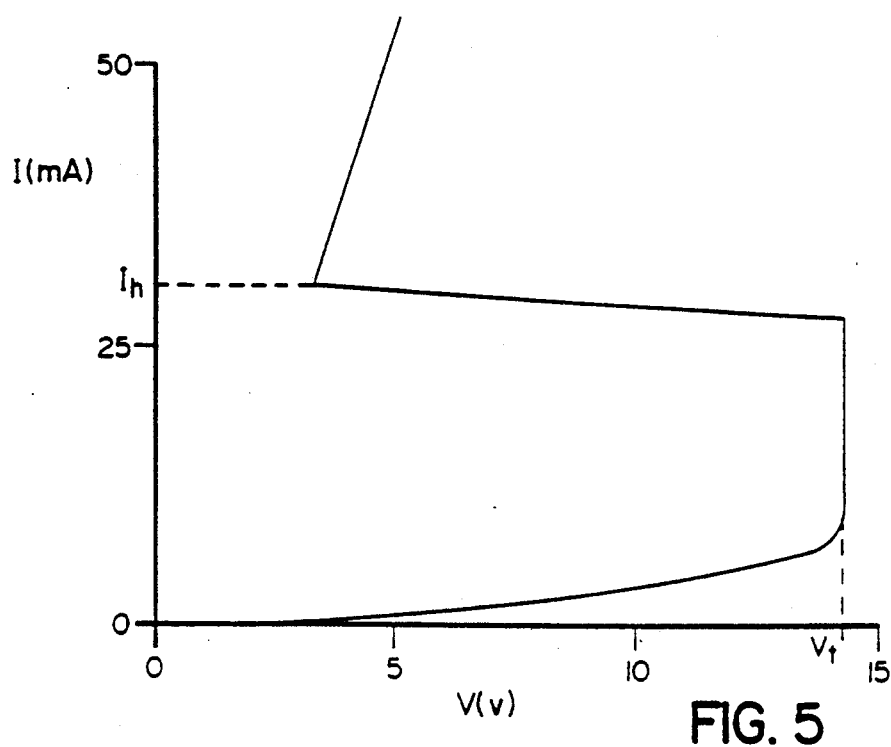
FIG. 5 is a plot of current versus voltage for an electrically tunable interference filter according to a second embodiment.

This modification dramatically modifies the electrical characteristics of the filter. In particular, the filter now operates electrically as a bistable electronic switch of the thyristor family. Such a switch can be switched from a high impedance "off-state" to L low impedance "on-state" by application of a voltage exceeding a predetermined threshold voltage, $V_t$, and can be switched from the "on-state" to the "off-state" by reducing the current below a predetermined holding current, $I_h$. These electrical characteristics are shown in FIG. 5.

When a voltage is applied to the filter according to the second embodiment, the same mechanisms as described above with respect to the first embodiment act to modify the refractive indices of the AlGaAs and GaAs sublayers 122, 124, and to thereby modify the optical characteristics of the filter. However, because the second embodiment has two distinct electrical states, it also has two distinct optical states. Consequently, the second embodiment is more appropriate for optical switching and digital modulation applications than the first embodiment. Moreover, because the second embodiment conducts more current than the first embodiment, larger shifts in the optical characteristics due to carrier injection are expected.

The larger currents of the second embodiment can generate more heat, and care should be taken to ensure that this heat is dissipated. Otherwise device reliability may suffer, and the dimensional stability which is required for predictable optical filter characteristics may not be achieved. Insufficient heat dissipation also leads to non-uniform current distribution causing non-uniformities in the refractive index profile and resulting optical filter characteristics.

Optically transparent contacts can be used in place of the annular metal contacts 130, 132 of the first and second embodiments. For example, Indium-Tin Oxide (ITO) contacts could be used. If transparent contacts are used, their thickness and refractive index must be considered in the optical design of the interference filter.

In the embodiments described above, current injection across forward biased pn junctions may result in light generation due to recombination within the semiconductor layers. In the GaAs/AlGaAs material system considered above, the generated light will have a wavelength approximately equal to 0.9 micrometers. Moreover, the semiconductor layers will absorb light of a similar wavelength, generating photocurrent. Thus, multilayer filters as described above employing the GaAs/AlGaAs materials system will not operate exactly as described above at wavelengths around 0.9 micrometers. When such filters are used at wavelengths greater than about 1.0 micrometer, however, there is no appreciable absorption in the semiconductor layers, and the generated light can be discriminated from the filtered light. Indeed, the generated light can provide a useful optical or visual check on the state of the tunable filter, and facets cleaved normal to the semiconductor layers may be used to provide optical feedback so as to modify the switching or tuning characteristics of the filter.

Different III-V semiconductor materials systems and compositions can be used along with different semiconductor layer thicknesses to achieve different optical and electrical characteristics. Empirical formulae giving the refractive index of AlGaAs as a function of Al content and wavelength, such as those reported by Afromowitz, and the mathematical theory of multilayer optical filters, as reported by Born and Wolf are useful in tailoring the design of tunable multilayer filters as described above to particular applications (see Afromowitz, Solid State Communications, Vol. 15, pp. 59-63, 1974 and Principles of Optics, Born and Wolf, Pergamon Press, 1964, pp. 51-70).

Figure 6:
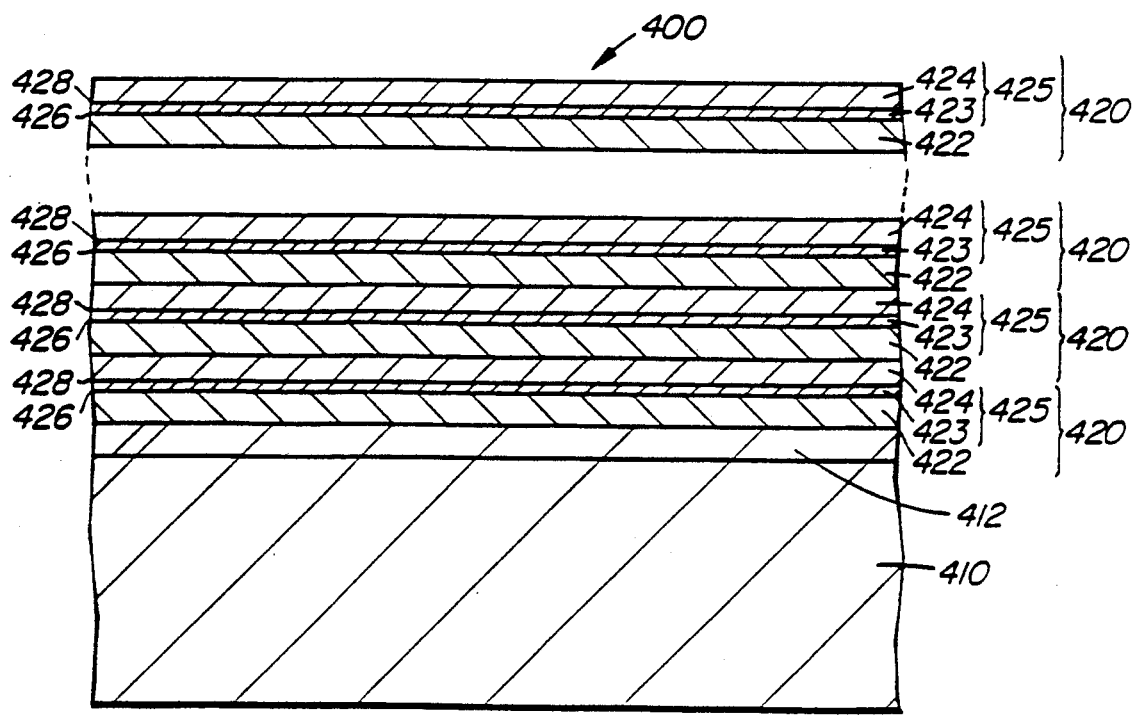
FIG. 6 is a cross-sectional view of semiconductor layers for an electrically tunable interference filter according to a third embodiment.

In tunable multilayer filters as described above, the electrical characteristics are primarily determined by the spacing of the pn junctions while the optical characteristics are primarily determined by the spacing of the heterojunctions. To simultaneously optimise both optical and electrical characteristics of the filters, it may be desirable to provide pn junctions which are distinct from the heterojunctions. FIG. 6 illustrates a semiconductor layer structure in which each layer 420 has a heterojunction 426 and a pn junction 428 which is distinct from the heterojunction 426.

The multilayer structure 400 comprises a GaAs substrate 410 and a GaAs buffer layer 412 as in the first, second and third embodiments. The structure 400 further comprises 20 semiconductor layers 420. Each of the layers 420 comprises an $Al_{0.3}Ga_{0.7}As$ sublayer 422 which is approximately 1025 Angstrom units thick and a GaAs sublayer 425 which is approximately 975 Angstrom units thick. Thus, the sublayers 422, 425 define a heterojunction 426 in each layer 420.

Each AlGaAs sublayer 422 is doped with Be to a p-type carrier concentration of $2 \times 10^{17}$ cm$^{-3}$. A 75 Angstrom unit thick stratum 423 of each GaAs sublayer 425 which is adjacent to a corresponding AlGaAs sublayer 422 is also doped with Be to a p-type carrier concentration of $2 \times 10^{17}$ cm$^{-3}$. Thus, there is no doping junction at the heterojunction 426 defined by these two sublayers 422, 425. A remaining 900 Angstrom unit thick stratum 424 of each GaAs sublayer 425 is doped with Si to an n-type carrier concentration of $5 \times 10^{17}$ cm$^{-3}$. The strata 423, 424, which together comprise the GaAs sublayer 425, therefore define a pn junction 428 which is distinct from the heterojunction 426 between the sublayers 422, 425. Stated in other terms, the AlGaAs sublayer 422 and the adjacent GaAs stratum 423 define a p-type portion of each semiconductor layer 420, the remaining GaAs stratum 424 defines an n-type portion of each semiconductor layer 420, and these portions together define a doping junction 428 which is distinct from but located closely adjacent to a corresponding heterojunction 426 of the semiconductor layer 420.

Electrical contacts may be added to the structure 400 in any of the manners described above for the first and second embodiments to form a tunable multilayer filter according to a third embodiment.

In similar structures, the pn junction can be located in either of the two sublayers 422, 425. The doping polarities of these structures and of the layer structure of the first, second and third embodiments can be reversed.

Tunable multilayer filters as described above may be used in reflection mode as described above, or in transmission mode. The transmissivity maxima will correspond to reflectivity minima, and vice versa.

While the thicknesses of each of the semiconductor layers 120, 420 are identical in the embodiments described above, it may be beneficial to use layers of different thicknesses for some applications. For example, in some passive multilayer optical filters, the thickness of each layer increases progressively from layer to layer. Similar structures may be useful in tunable multilayer filters for some applications.

A greater or lesser number of layers may be used depending on the filter characteristics required. For most applications, at least 10 layers are recommended.

Multiple quantum wells may be constructed within the sublayers to enhance the effective refractive index sensitivity of electric field changes. For example, very thin strata of GaAs (of the order of 100 Angstrom units thick) separated by very thin strat of AlGaAs (also of the order of 100 Angstrom units thick) may be formed within the thicker GaAs sublayers 124 to define multiple quantum wells within these sublayers. It is known that such multiple quantum wells can accentuate electric field induced changes in refractive index caused by the quantum confined Stark effect (see for example Weber et al, Appl. Phys. Lett., Vol. 54, No. 24, June 12, 1989). Such multiple quantum wells should increase the spectral shift of the filter characteristics when the filter is under electrical bias. However, because the strata defining the multiple quantum wells are very much thinner than the operating wavelength of the filter, they should not significantly perturb the optical characteristics of the filter when it is electrically unbiased.

I claim:

1. An electrically tunable interference filter, comprising:
    a semiconductor body comprising a plurality of semiconductor layers;
        each semiconductor layer comprising a first sublayer of a first semiconductor composition and a second sublayer of a second semiconductor composition, the first and second sublayers together defining a heterojunction, the first semiconductor composition being substantially the same for all layers, the second semiconductor composition being substantially the same for all layers, the first semiconductor composition having a first bandgap, and the second semiconductor composition having a second band gap which exceeds the first band gap; and
        each semiconductor layer having a first portion which is doped with an n-type dopant and a second portion which is doped with a p-type dopant, the first and second portions together defining a pn junction which is located at or closely adjacent to the heterojunction; and
    electrical contacts to the semiconductor body for biasing the pn junctions, the electrical contacts comprising;
        an electrical contact to the top sublayer of the top layer; and
        an electrical contact to the bottom sublayer of the bottom layer;
    so that the pn junctions are electrically connected in series.

2. An interference filter as defined in claim 1, wherein at least one of the electrical contacts is annular.

3. An interference filter as defined in claim 1, wherein at least one of the electrical contacts is transparent.

4. An interference filter as defined in claim 1 having an odd number of pn junctions.

5. An interference filter as defined in claim 1 having an even number of pn junctions.

6. An interference filter as defined in claim 1, wherein each layer is substantially identical to each other layer.

7. An interference filter as defined in claim 1, wherein some of the layers have thicknesses which differ from thicknesses of others of the layers.

8. An interference filter as defined in claim 7, wherein the layer thicknesses increase progressively from layer to layer.

9. An interference filter as defined in claim 1, wherein the first portion of each sublayer is the first sublayer, the second portion of each layer is the second sublayer, and the heterojunction is a pn heterojunction.

10. An interference filter as defined in claim 1, wherein the first portion of each sublayer is the second sublayer, the second portion of each layer is the first sublayer, and the heterojunction is a pn heterojunction.

11. An interference filter as defined in claim 1, wherein the pn junction is located in the first sublayer adjacent to the heterojunction.

12. An interference filter as defined in claim 11, wherein the first portion is located in the first sublayer.

13. An interference filter as defined in claim 11, wherein the second portion is located in the first sublayer.

14. An interference filter as defined in claim 1, wherein the pn junction is located in the second sublayer adjacent to the heterojunction.

15. An interference filter as defined in claim 14, wherein the first portion is located in the second sublayer.

16. An interference filter as defined in claim 14, wherein the second portion is located in the second sublayer.

17. An interference filter as defined in claim 1, having at least 10 semiconductor layers.

18. An interference filter as defined in claim 1, wherein at least some of the sublayers comprise multiple quantum wells.

* * * * *